United States Patent [19]
Sa'don et al.

[11] Patent Number: 5,664,306
[45] Date of Patent: Sep. 9, 1997

[54] APPARATUS AND METHOD FOR PRODUCING COLORED KNITTED NET

[75] Inventors: Machluf Ilan Sa'don, Kibbutz Galed; Ishai Doron; Ytzhak Govrin, both of Kibbutz Mishmar Haemek, all of Israel

[73] Assignee: Tama Plastic Industry, Kibbutz Mishmar Ha'emek, Israel

[21] Appl. No.: 668,497

[22] Filed: Jun. 4, 1996

Related U.S. Application Data

[63] Continuation-in-part of Ser. No. 385,744, Feb. 8, 1995, abandoned, which is a continuation of Ser. No. 138,882, Oct. 19, 1993, abandoned, which is a continuation of Ser. No. 911,194, Jul. 9, 1992, abandoned.

[51] Int. Cl.$^6$ .............. D03D 29/00; D04B 5/00; D04C 7/00; D04D 7/00
[52] U.S. Cl. .............. 28/149; 66/202; 8/149; 101/172
[58] Field of Search .............. 8/149, 151.2, 152; 66/1 R, 202, 192; 118/234, 246, 258, 419, 420, 423; 101/172; 28/149, 145

[56] References Cited

U.S. PATENT DOCUMENTS

| | | | |
|---|---|---|---|
| 3,010,181 | 11/1961 | Marks | 66/1 R |
| 3,762,867 | 10/1973 | Crawford | 8/151.2 X |
| 3,894,413 | 7/1975 | Johnson | 68/205 R |
| 3,898,035 | 8/1975 | Tillotson | 8/149 |
| 3,969,779 | 7/1976 | Stewart, Jr. | 8/149 |
| 4,022,151 | 5/1977 | Achelpohl | 118/246 X |
| 4,033,154 | 7/1977 | Johnson | 68/205 R |
| 4,047,271 | 9/1977 | Paterson et al. | 8/149 X |
| 4,060,999 | 12/1977 | Marks et al. | 66/202 X |
| 4,078,253 | 3/1978 | Kajiura et al. | 364/900 |
| 4,153,961 | 5/1979 | Cleveland | 8/149 |
| 4,253,383 | 3/1981 | Noe | 493/200 |
| 4,570,789 | 2/1986 | Fritz et al. | 206/83.5 |
| 4,793,035 | 12/1988 | Nehrenberg et al. | 28/183 |
| 4,819,310 | 4/1989 | Beerli et al. | 28/185 |
| 4,841,307 | 6/1989 | Graham | 364/1.1 |
| 4,856,104 | 8/1989 | Sroll et al. | 364/470 |
| 4,923,743 | 5/1990 | Stewart, Jr. et al. | 427/288 |
| 5,063,758 | 11/1991 | Keller et al. | 68/205 R |
| 5,104,714 | 4/1992 | Leiber et al. | 66/202 X |
| 5,136,520 | 8/1992 | Cox | 8/149 X |

FOREIGN PATENT DOCUMENTS

| | | | |
|---|---|---|---|
| 8600348 | 1/1986 | European Pat. Off. | 8/151.2 |
| 871986 | 3/1979 | France . | |
| 874437 | 6/1979 | France . | |
| 3925035 | 1/1991 | Germany . | |
| 7801075 | 9/1978 | Netherlands . | |
| 7902047 | 9/1979 | Netherlands . | |
| 1313764 | 4/1973 | United Kingdom | 8/151.2 |

OTHER PUBLICATIONS

Mayer Textile Machine Corp., "Iso-Drawing Unit for Tape Yarns", brochure.
Mayer Textile Machine Corp., "Raschel Machine for the Production of Nets", brochure.

*Primary Examiner*—John J. Calvert
*Attorney, Agent, or Firm*—Morgan & Finnegan, LLP

[57] ABSTRACT

An apparatus for producing colored knitted net from a plurality of individual ribbons. A coloring apparatus adapted to color selected ribbons of said plurality of individual ribbons is provided between the orientation and knitting stages in the net production process. After the selected ribbons have been colored, a knitting apparatus knits the plurality of individual ribbons into a Raschel net.

29 Claims, 6 Drawing Sheets

APPARATUS AND METHOD FOR PRODUCING COLORED KNITTED NET

CROSS-REFERENCE TO RELATED APPLICATIONS

This application is a continuation-in-part of U.S. patent application Ser. No. 08/385,744, filed Feb. 8, 1995, now abandoned, which was a continuation of U.S. patent application Ser. No. 08/138,882, filed Oct. 19, 1993, now abandoned, which was a continuation of U.S. patent application Ser. No. 07/911,194, filed Jul. 9, 1992, now abandoned.

BACKGROUND OF THE INVENTION

The invention relates to methods and apparatus for the production of colored knitted nets. More particularly, the invention relates to apparatus and methods for coloring individual ribbons of knitted nets.

Knitted nets are currently used for products including sacks for agricultural produce, bird protection nets, shading nets, insect protection nets and nets for wrapping round bales of hay. Such knitted nets are generally produced in a process which includes production of a primary film, slitting of the film into individual ribbons, and orientating the ribbons by an I.S.O. ribbon production machine, and knitting the individual ribbons into a knitted net and winding the knitted net onto a roll by a Raschel knitting machine. The primary film may be produced in various colors according to the intended application of the knitted net.

During production, individual ribbons may tear after orientation and sometimes during printing. A detecting device is therefore provided and positioned to detect ribbon breakage and stop the machine at the earliest moment. It will be appreciated that early detection is important because Raschel knitting machines cannot rotate backwards, opposite to the direction of the knitting. Thus, if ribbon breakage detection and machine stoppage is too late, the resulting knitted net is defective and cannot be repaired due to the construction of the machine. After knitting, the netting is wound on a roll and, as previously mentioned, the netting rolls cannot be unrolled in order to fix any defects.

Figure 1:
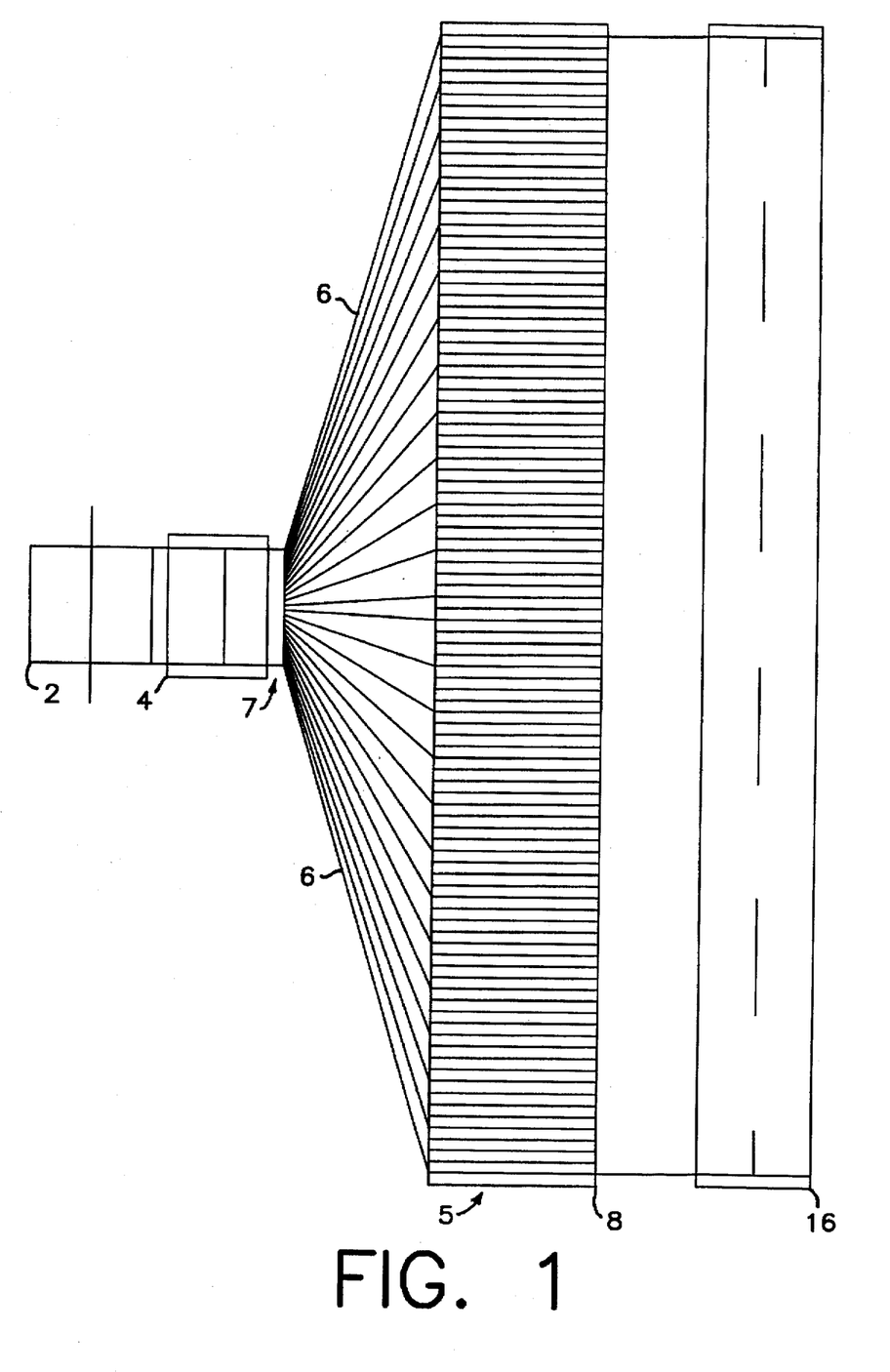
FIG. 1 shows a plan view of an apparatus for the production of knitted netting including the coloring apparatus in accordance with the invention.

As illustrated in FIG. 1, when the ribbon production and knitting machine layouts are viewed from above, it may be observed that the ribbon production machine 4 is many times narrower than the knitting machine 8. This is because after slitting and orienting the oriented ribbons 6 are knitted on a Raschel machine on which the distance between the needles is approximately 1" (25.4 mm). For example, if a film is slit "T10" (meaning 10 ribbons per inch) and 210 ribbons are knitted, the necessary film width is about 533 mm and the knitted net width is about 5,308 mm.

Because the ribbon production machine and the knitting machine are made by different manufacturers, each machine is provided with its own independent ribbon breakage detection device. Both machines use a type of device called a "Lamela". A Lamela is a hollow piece of metal through which an individual ribbon passes. When a ribbon tears, the corresponding Lamela moves downward (due to its weight) and makes electrical contact between two bars thereby stopping the machine. On the ribbon production machine 4, the Lamelas 3 are located at the horizontal point from which the ribbons begin to spread on their way to the knitting machine 8.

It may be appreciated that having 210 Lamelas in a width of about 533 mm creates problems giving rise to poor performance. Additionally, an inherent disadvantage of the Lamela system is that the Lamelas can only be located where the ribbons pass horizontally. Accordingly, the Lamela detection system is provided at the horizontal end 7 of the ribbon production machine 4. Similarly, on the knitting machine 8, the Lamela detection system is located on the first horizontal area 5 after spreading of the ribbons coming from the ribbon production machine 4.

The location of the Lamelas on the knitting machine has both advantages and disadvantages. An advantage is that a distance of 25.4 mm between ribbons provides adequate space for hanging Lamelas. A disadvantage is that due to friction, sticking, electrostatic charges, and the like, the Lamelas often either do not have sufficiently rapid response time or do not make electrical contact.

Frequently, there is a desire for knitted net which includes a strip of a particular color that differs from the overall color of the net. This may be for providing a strip of a particular shade at the end or middle of the net to indicate the netting product as originating from a specific supplier. Different color markings for similar products may also be used either for marking the end of a roll or in conjunction with a photoelectric cell to count the number of cuts.

A common method of coloring knitted netting is to use bobbins of different colored ribbons. These bobbins of colored ribbons are conveniently placed at the knitting machine and the colored ribbons are threaded into the machine as replacements for the original ribbons. Usually these colored ribbons have some amount of orientation and the bobbins are, therefore, located after the orientation stage in the net production process. The original ribbons of the overall color which have been replaced are automatically wound onto rolls and then recycled.

In the Raschel method of knitting, two types of ribbons are employed; transverse ribbons and longitudinal ribbons. When there is a desire to change color in the netting in the longitudinal direction, ribbons may be replaced as described above. When there is a desire to change color in the transverse direction for some length, however, the above described method may not be used as the knitting of the longitudinal ribbons takes less than a second. Shutting down the knitting machine, changing the ribbons, and restarting the machine to run for a such a short period of time is extremely inefficient even if longer lengths are to be colored.

Accordingly, the existing coloring method is only useful when there is a need to color longitudinal ribbons. Additionally, multiple colored ribbons must be stocked, each having characteristics compatible with the final product. The existing coloring method also introduces technical complications in the net knitting procedure causing wastage of raw materials and increase in the cost of the final product.

Accordingly, there is a need in the art to provide an efficient method and apparatus for coloring knitted nets during production of the netting.

SUMMARY OF THE INVENTION

In view of the foregoing it is an object of the invention to provide an apparatus and method for producing colored knitted net which colors the individual ribbons of the knitted net.

It is a further object of the invention to provide an apparatus and method for producing colored knitted net which may be incorporated into the on-line production of the knitted net.

It is a further object of the invention to provide an apparatus and method for producing colored knitted net which is independent of the characteristics of the individual ribbons of the knitted net.

It is a further object of the invention to provide an apparatus and method for producing colored knitted net which has a ribbon breakage detection system that operates independent of the orientation and spacing of the ribbons.

In accordance with the invention, an individual ribbon coloring apparatus is provided in the net production process after the orientation stage and prior to the knitting stage. All or some of the individual ribbons may pass through the coloring apparatus. Each ribbon passing through the coloring apparatus may be either included in or excluded from the coloring process in accordance with a control system which operates consistently with the knitting machine cycle, thereby selecting which of the individual ribbons are to be colored. It is thereby possible to program the system to color any particular area of the knitted net, including lengthwise, widthwise, strips or in any other desired pattern. Additionally, the coloring apparatus is non-restrictive in that the coloring apparatus does not grip, pinch, hold, or otherwise impede the travel of the ribbons through the netting production apparatus.

As preferably embodied, a coloring apparatus includes a variable speed roller which rotates in a bath of colored ink. The ribbons are colored by contacting the roller and will remain uncolored either when not contacting the roller or when the roller is not rotating. A control system may be provided for starting, stopping, and controlling the speed of the roller and for raising the ribbons from the roller and may include an electromagnetic or pneumatic piston which is operated in accordance with signals coming from a real time control system. Alternatively, the complete coloring apparatus may be moved down and out of contact with the ribbons.

BRIEF DESCRIPTION OF THE DRAWINGS

The accompanying drawings, referred to herein and constituting a part hereof, illustrate preferred embodiments of the invention, and, together with the description, serve to explain the principles of the invention, wherein.

DETAILED DESCRIPTION OF THE DRAWINGS

In the following detailed description of the drawings wherein several alternative embodiments of the invention are discussed, like components are given like numeral designations for convenience.

Figure 2:
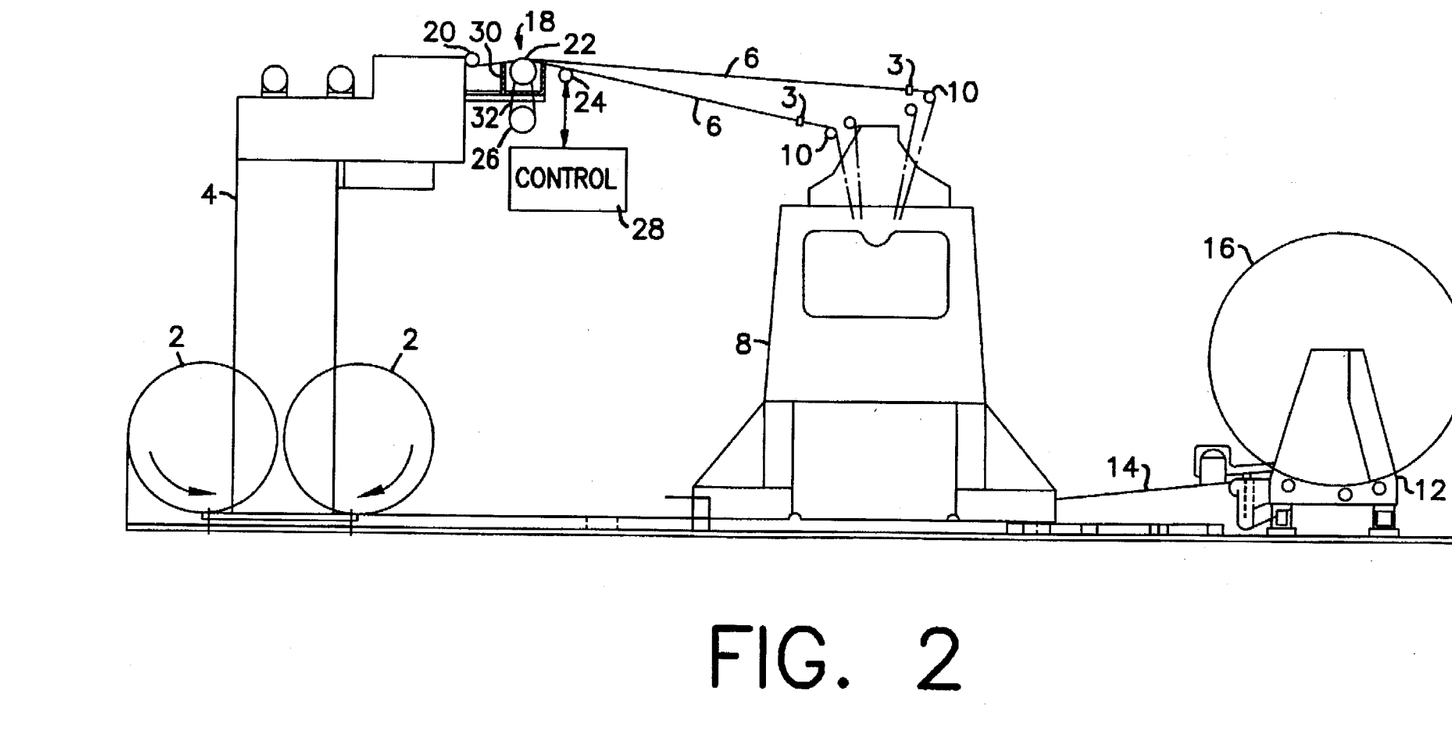
FIG. 2 shows a side view of an apparatus for the production of knitted netting including the coloring apparatus in accordance with the invention.

In FIGS. 1 and 2 are shown an apparatus for producing knitted netting. A primary film, e.g., linear low density polyethylene (LLDPE) is supplied on rolls 2. The primary film enters drawing unit 4 which slits and orients the primary film into individual ribbons 6. A drawing unit appropriate for this purpose is the ISO In-Line Drawing Unit for tape yarns from ISO Innovation Sondermaschinenbau GmbH (Germany). The individual ribbons 6 exit the drawing unit and enter knitting machine 8 via alignment rollers 10. Knitting machine 8 knits the individual ribbons 6 into a continuous Raschel knitted net 14. Appropriate knitting machines for this purpose is the Raschel machine from Karl Mayer (Germany) or similar machines. The continuous knitted netting 14 is wound onto roll 16 by winding machine 12.

Figure 3:
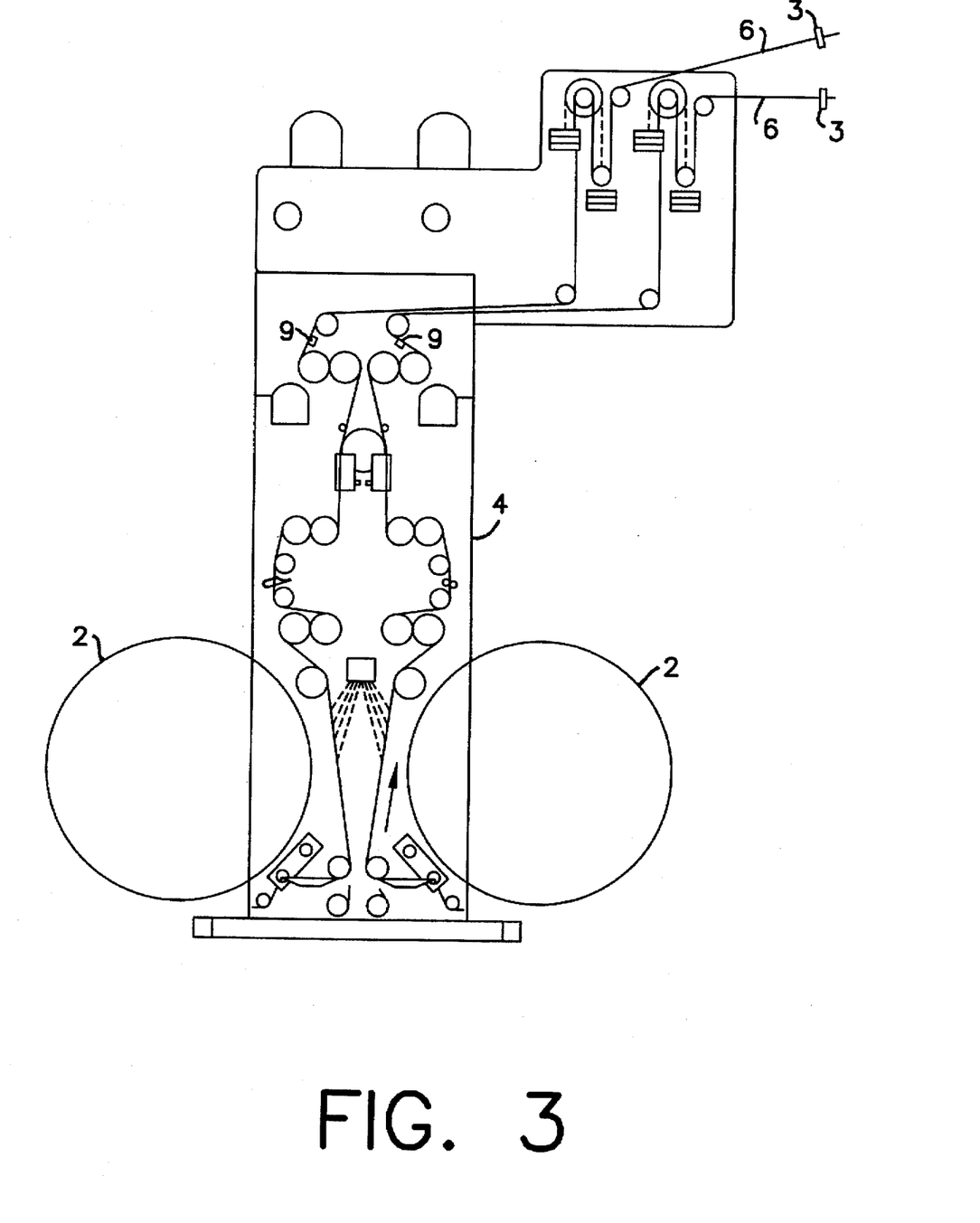
FIG. 3 is a side sectional view of ribbon production machine.

FIG. 3 shows a side sectional view of the ribbon production machine 4 according to the invention wherein are provided photoelectric detectors 9 (after slitting and orienting of the ribbons) to detect ribbon breakage. A photoelectric detector appropriate for this purpose is photoelectric reflex switch model VL 180 from Sick Optic-Electronic, Inc. (Eden Prairie, Minnesota).

Figure 4:
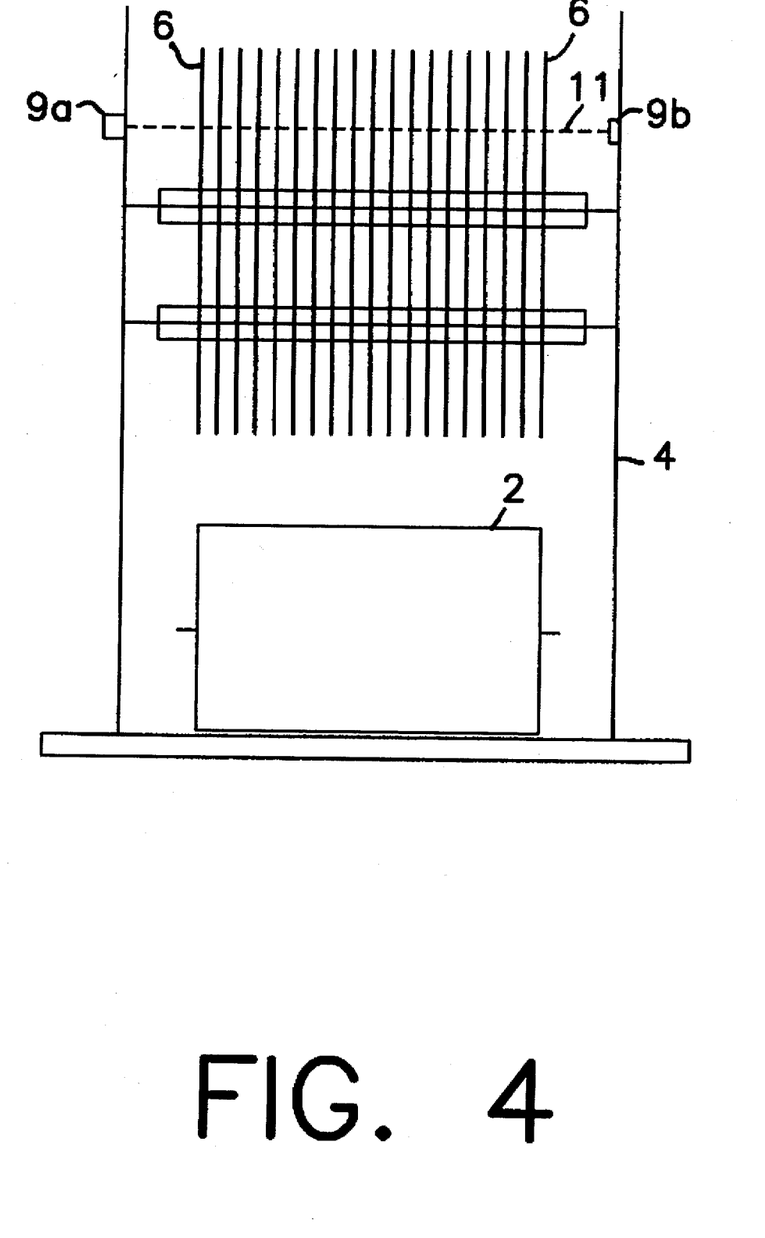
FIG. 4 is a partial front sectional view of the ribbon production machine illustrating the positioning of one photodetector.

As preferably embodied, one photoelectric detector is provided for each primary film. A partial front sectional view of the ribbon production machine illustrating the positioning of one of the photoelectric detectors is show in FIG. 4. The photoelectric reflex switch 9a creates a beam of light 11 which is reflected by a reflector 9b. When the beam between the photoelectric reflex switch and the reflector is interrupted by a ribbon 6, the photoelectric reflex switches on or off an electric current. The distance between the photoelectric reflex switch and the reflector depends upon the width of the film to be detected. As preferably embodied, the distance between the photoelectric reflex switch 9a and the reflector 9b is about 65 cm, the width of the ribbon production machine 4.

Use of the photoelectric detector to detect ribbon breakage provides numerous advantages over the Lamela system, including:

(1) The detection system positioning is not limited to a horizontal ribbon location;

(2) Distance between ribbons is not a limitation of the detection system;

(3) The detection system does not require placement of a Lamela on each individual ribbon;

(4) Problems resulting from sticking Lamelas are avoided; and (5) Problems resulting from dirt, dust, powder, and the like interfering with electric conduction in the Lamela system are avoided.

Advantageously, the use of a photoelectric detector allows the ribbon breakage system to be located just at the end of the orientation area, which is the farthest possible location from the knitting area, where the ribbons pass vertically. When a ribbon is broken in the orientation area, the remaining ribbon moves upward, due to the pull of the knitting machine, trips the photoelectric beam and stops the ribbon production and knitting machines. In the case where a ribbon is broken in the painting area 7, this specific ribbon weakens and flips or bends and again trips the photoelectric beam stopping the machine.

It may be appreciated that whenever the knitting machine stops the ribbon production machine stops as well. It may also be appreciated that the photoelectric detector may be used in addition to the Lamela system in the knitting machine to provide an extra safety margin.

In accordance with the invention, interposed between drawing unit 4, where the primary film is slit and oriented into individual ribbons, and knitting machine 8, where the knitted netting is actually knit, is coloring apparatus 18. Coloring apparatus 18 includes alignment roller 20, coloring roller 22 and contact roller 24. Coloring roller 22 is located in vessel 30 and is connected by drive belt 32 to motor 26. Alternatively, the coloring roller may be driven by direct motor connection. Speed and movement of contact roller 24 are controlled by control 28 to engage or disengage the individual ribbons 6 from contact with coloring roller 22.

The coloring apparatus is typically used for coloring the last 100 m of a roll of netting having a full length of 2,000 m or 3,000 m. After the end of a roll, roller speed is adjusted, knitting of a new roll of netting is begun, and rotation of the coloring roller is automatically stopped and coloring ceases. After knitting 1,900 m or 2,900 m (or any other desired length) the roller begins rotation and coloring is performed over the complete netting along 100 m or other desired distance. After reaching the desired netting length, the ribbon production machine, the painting apparatus, and the knitting machine stop.

It may be appreciated from FIG. 2 that the preferred point in the net production process to color the individual ribbons is after the ribbons are oriented and before the ribbons are knitted into the net. That is, the last point after ribbon production before spread of the ribbons going into the knitting machine. If coloring is performed before orientation, the colored ink which colors the ribbon will be spread over an area 5–7 times longer than the original area because of the drawing process during ribbon orientation. The color will, therefore, become very dull. There may also be unexpected reactions of the colored ink on the ribbon because of the heat which is needed for orientation.

Figure 5:
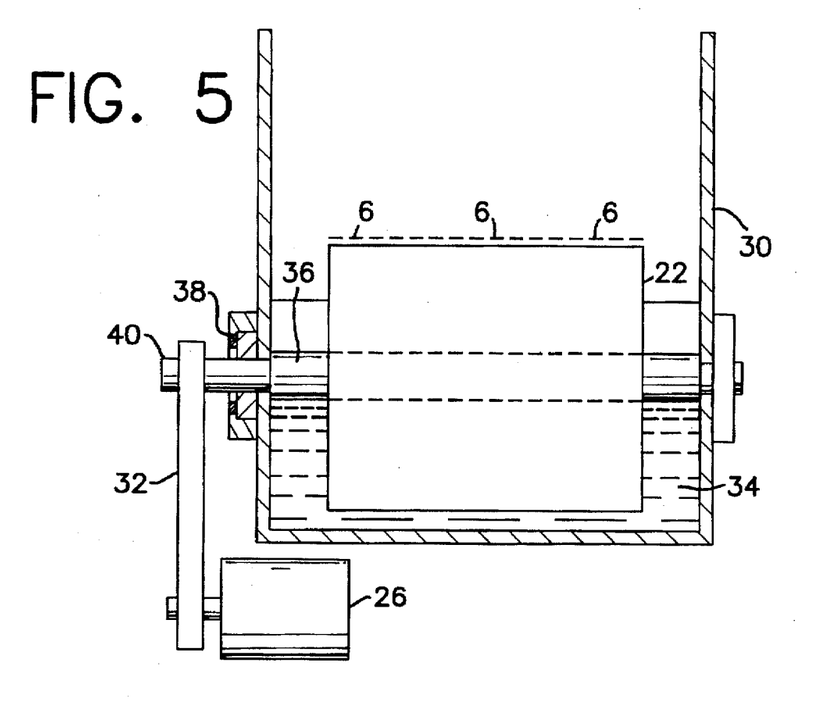
FIG. 5 is a front sectional view of the coloring apparatus.

In FIG. 5 is shown a front sectional view of the coloring apparatus in accordance with the invention. The coloring apparatus includes a vessel 30 filled with a desired colored ink 34 to a predetermined level. The preferred colored ink includes a basic coloring agent NEWFLEX OD C/41 made by SUNCHEMICAL and may be mixed with a solvent that evaporates quickly. Various paints may also be used.

Inside the vessel there is a rough coloring roller 22 which has about half of its diameter immersed in the colored ink 34 and which rotates on an axle 36. The coloring roller 22 is a simple rough metal axle with a knurled roller surface. The axle 36 is supported by two sealed bearings 38. A length 40 of the axle protrudes through the walls of the vessel 30 and beyond the bearings 38. A small motor 26 rotates the coloring roller 22 via drive belt 32 connected to the protruding length of the axle.

The individual ribbons 6 pass transverse to the axial direction of the coloring roller 22 and contact the upper circumference of the coloring roller. When in contact with the coloring roller 22, the colored ink will color one side of the individual ribbons 6 as the coloring roller 22 rotates in colored ink 34.

In accordance with signals from a real time control system, rotation of the coloring roller may be controlled. Such control systems for the dyeing and printing of materials are known in the art and are described, e.g., in U.S. Pat. No. 3,969,779, the disclosure of which is incorporated herein by reference. When the coloring roller does not rotate, colored ink does not reach the upper portion of the coloring roller circumference and the coloring of the individual ribbons ceases. It has been found that the most useful way of stopping the painting process is by stopping the roller rotation.

Figure 6:
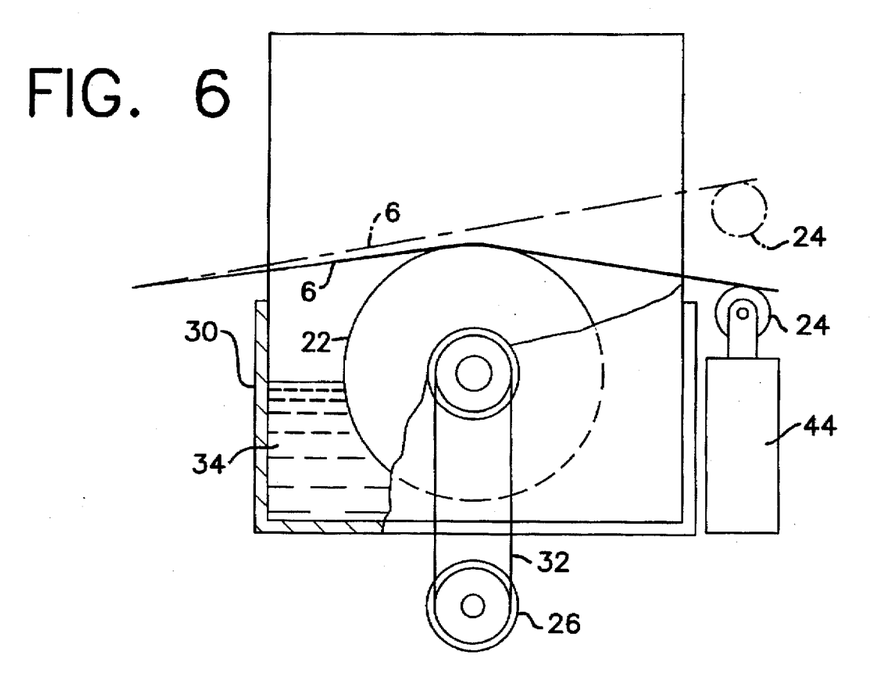
FIG. 6 is a side partially sectional view of the coloring apparatus.

Alternatively, as shown in FIG. 6, contact roller 24 may be positioned downstream of rough roller 22 and controlled by electromagnetic or pneumatic piston 44 to alter the path of travel of individual ribbons 6. When piston 44 is retracted, contact roller 24 allows contact between individual ribbons 6 and coloring roller 22. When extended, contact roller 24 alters the path of travel of individual ribbons 6 thereby preventing contact between the individual ribbons and coloring roller 22. In the extended position, no coloring of the individual ribbons occurs despite continued rotation of the coloring roller.

Figure 7:
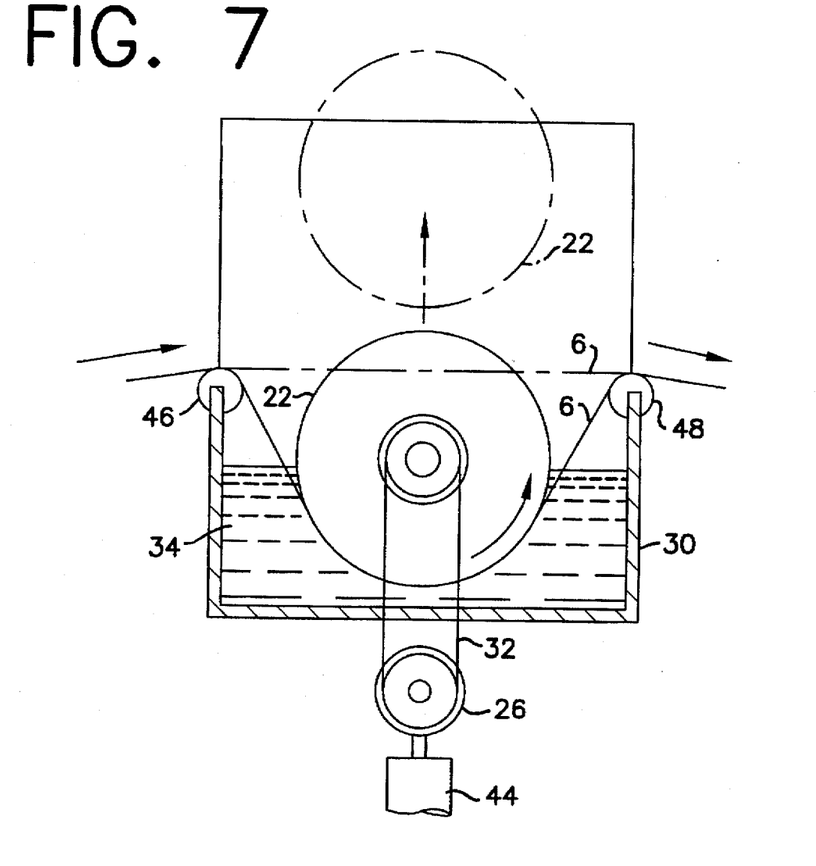
FIG. 7 is a side sectional view of an alternative embodiment of the coloring apparatus.

Two-sided coloring of the ribbons can be accomplished by repositioning the ribbons so that the ribbons contact the lower circumference of the coloring roller 22. In FIG. 7, an entrance roller 46 and an exit roller 48 are provided at vessel 30 to direct the path of travel of individual ribbons 6 to the underside of coloring roller 22.

In accordance with this embodiment, the path of travel of the individual ribbons 6 is directly through the colored ink 34 and in contact with coloring roller 22 thereby coloring both sides of the individual ribbons. Electromagnetic or pneumatic piston 44 is provided to raise and lower coloring roller 22 and motor 26 to bring coloring roller 22 in and out of contact with individual ribbons 6.

In this case, when coloring is to be stopped, the coloring roller is raised in order to allow free passage of the individual ribbons. In its raised position individual ribbons 6 travel directly from entrance roller 46 to exit roller 48 without contacting either coloring roller 22 or colored ink 34. Accordingly, no coloring of individual ribbons 6 occurs in this condition.

Variation of the amount of paint to be applied to individual ribbons may be accomplished by adjusting the speed of the coloring roller. Whenever there is a mismatch between the linear speed of the coloring roller and the ribbon speed, slippage between the coloring roller and the ribbon is created. Where the linear speed of the coloring roller is less than the speed of the ribbon, and because the roller surface is rough, some degree of wiping is created and less ink is applied to the ribbons.

Where the linear speed of the coloring roller is greater than the speed of the ribbon, more ink is applied to the ribbon, as a "pushing" of ink over the ribbon is created. The roller speed may be varied by such electrical speed control apparatus as cited above and are known in the art and may be adjusted manually according to the application.

Thus, it may be appreciated that when contact between the coloring roller and the ribbons is broken, the ribbons will not be painted. In addition, the amount of paint over the ribbons may be varied by varying the speed of the coloring roller speed. The optimum amount of paint over the ribbons is provided when the linear roller speed is identical to the ribbon speed. Accordingly, reducing the speed of the coloring roller relative to the ribbon speed reduces the amount of paint applied to the ribbons. Conversely, increasing the speed of the coloring roller relative to the ribbon speed increases the amount of ink applied to the ribbons.

In order to provide proper system operation, when both machines stop as a result of a broken ribbon, the coloring roller also stops. In such cases, the machine stoppage is usually only for a very short time. If machine stoppage is for a longer time, i.e., more than a few hours, the ribbons may be raised up from the coloring roller and the roller continues rotation to avoid paint sticking. If the machine stoppage is for yet a longer time, the coloring roller is stopped, the coloring ink removed, and the vessel and coloring roller cleaned.

Figure 8:
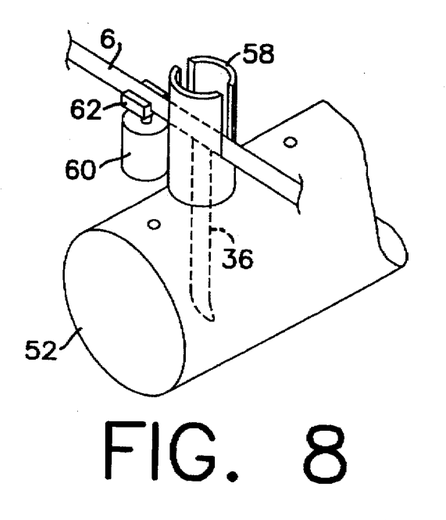
FIG. 8 is a perspective view of a further alternative embodiment of the coloring apparatus.

As another alternative embodiment of the invention, the coloring apparatus may be implemented utilizing capillary action. As shown in FIG. 8, a cylindrical vessel 52 is filled with colored ink 34 to about half its diameter. A wick 56 is held by a wick support 58 located perpendicular to the passage of the individual ribbons 6 and is immersed into the colored ink 34.

As the ribbon 6 passes through the wick support 58, the ribbon contacts the upper portion of the wick 56 which is wet with colored ink because of capillary action. It may be appreciated that a particular advantage of this embodiment is that no moving parts are required for the coloring apparatus itself. If an interruption in coloring is desired, the ribbon 6 is simply moved upward and out of contact with the thread by a pneumatic or electromagnetic cylinder 60 with ribbon guide 62.

Control of the movement of the above-described rollers and pistons may be obtained via electromagnetic or pneumatic devices as are commonly known in the art and may be maintained under computer programmed control. A movement of about 1–3 mm is sufficient to break the contact between the coloring device and the individual ribbons. When the ribbons are raised, contact between the coloring device and the individual ribbons is broken and coloring ceases. It will be appreciated that this method and apparatus for producing colored knitted net is extremely versatile and with appropriate control any colored pattern may be created.

Figure 9:
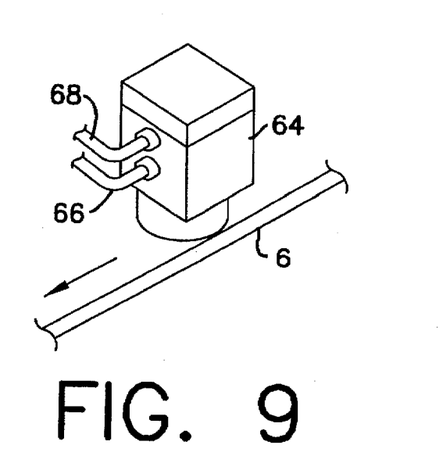
FIG. 9 is a perspective view of a further alternative embodiment of the coloring apparatus.

As a further embodiment, the coloring apparatus may also implemented using an ink jet printer as shown in FIG. 9. Ink jet 64 is positioned directly above individual ribbons 6 and is connected via feed line 66 to a colored ink supply and via connection 68 to an appropriate control system. An appropriate ink jet printer is ALPHA JET by Metronic Geratebau GmbH & Co. (Germany).

Ink jet printers create an electrostatic field which moves the ink jet in order to create letters and other complex patterns. For printing on ribbons, however, all that is required is on/off control of the ink jet. Ink jet equipment works very fast creating a printed line 3 mm thick at a speed of 600 m/min. At this rate, an ink jet can print by line scanning (similar to a printer wherein the print head moves back and forth in the X direction and the paper moves in the Y direction) at a rate of about 1.8 sq. m/min. This printing rate is sufficient for coloring oriented ribbons. It will be appreciated that an advantage of this embodiment is that the ribbons which are to be colored may be scanned and colored by the ink jet printer under computer program control, instead of mechanically picking-up the ribbons when the ribbons are not to be colored.

Advantageously, the ability of having full program control of the position of "jet on" or "jet off" signals allows continuous control as to which (and when) individual ribbons will be colored. This particular embodiment may also be implemented with less physical equipment then previously described embodiments.

While the invention has been described in its preferred embodiments, it is to be understood that the words which have been used are words of description, rather than limitation, and that changes may be made within the purview of the appended claims without departing from the true scope and the spirit of the invention in its broader aspects.

What is claimed:

1. An apparatus for producing colored knitted net, comprising:
    a source providing a plurality of individual oriented ribbons at constant speed;
    a coloring apparatus including a plurality of dye applicators for non-restrictive coloring selected ribbons of said plurality of individual oriented ribbons from said source; and
    a knitting apparatus for knitting said plurality of individual oriented ribbons from said coloring apparatus into a net;
    wherein said coloring apparatus further comprising means for varying the amount of color applied to said plurality of individual oriented ribbons.

2. An apparatus according to claim 1, wherein said plurality of individual ribbons consist essentially of linear low density polyethylene.

3. An apparatus according to claim 1, wherein said plurality of individual ribbons are produced from a primary film.

4. An apparatus according to claim 1, wherein said knitting apparatus is adapted to knit a Raschel net.

5. An apparatus according to claim 1, wherein said coloring apparatus further comprises:
    an ink supply; and
    a coloring roller adapted to apply ink from said ink supply to said selected ribbons of said plurality of individual ribbons.

6. An apparatus according to claim 5, further comprising means for controlling rotation of said coloring roller.

7. An apparatus according to claim 6, wherein said means for controlling rotation of said coloring roller includes means for stopping rotation of said coloring roller.

8. An apparatus according to claim 5, further comprising means for controlling contact between said coloring roller and said selected ribbons of said plurality of individual ribbons.

9. An apparatus according to claim 1, further comprising photoelectric means for detecting breakage of individual oriented ribbons.

10. A method for producing colored knitted net, comprising the steps of:
    providing a plurality of individual oriented ribbons at constant speed;
    non-restrictively coloring selected ribbons of the plurality of individual oriented ribbons using a plurality of individually selectable dye applicators; and
    knitting the plurality of individual oriented ribbons into a net; and
    variably applying the amount of color to said plurality of individual oriented ribbons.

11. A method according to claim 10, further comprising the step of knitting the plurality of individual ribbons into a Raschel net.

12. A method according to claim 10, further comprising the step of applying ink from an ink supply to the selected ribbons of the plurality of individual ribbons with a coloring roller.

13. A method according to claim 12, further comprising the step of controlling rotation of the coloring roller.

14. A method according to claim 13, wherein said step of controlling rotation of the coloring roller includes stopping rotation of the coloring roller.

15. A method according to claim 12, further comprising the step of controlling contact between the coloring roller and the selected ribbons of the plurality of individual ribbons.

16. A method according to claim 10, further comprising photoelectrically detecting breakage of individual oriented ribbons.

17. An apparatus for producing colored knitted net, comprising:
    a source providing a plurality of individual oriented ribbons at constant speed;

a coloring apparatus including a plurality of dye applicators for coloring selected ribbons of said plurality of individual oriented ribbons from said source; and a knitting apparatus for knitting said plurality of individual oriented ribbons from said coloring apparatus into a net;

wherein said coloring apparatus includes photoelectric means for detecting breakage of individual oriented ribbons.

18. An apparatus according to claim 17, wherein said plurality of individual ribbons consist essentially of linear low density polyethylene.

19. An apparatus according to claim 17, wherein said plurality of individual ribbons are produced from a primary film.

20. An apparatus according to claim 17, wherein said knitting apparatus is adapted to knit a Raschel net.

21. An apparatus according to claim 17, wherein said coloring apparatus further comprises:

an ink supply; and a coloring roller adapted to apply ink from said ink supply to said selected ribbons of said plurality of individual ribbons.

22. An apparatus according to claim 21, further comprising means for controlling rotation of said coloring roller.

23. An apparatus according to claim 21, further comprising means for controlling contact between said coloring roller and said selected ribbons of said plurality of individual ribbons.

24. An apparatus according to claim 17, wherein said coloring apparatus is adapted to vary the amount of color applied to said plurality of individual oriented ribbons.

25. A method for producing colored knitted net, comprising the steps of:

providing a plurality of individual oriented ribbons at constant speed;

non-restrictively coloring selected ribbons of the plurality of individual oriented ribbons using a plurality of individually selectable dye applicators; and knitting the plurality of individual oriented ribbons into a net; and photoelectrically detecting breakage of individual oriented ribbons.

26. A method according to claim 25, further comprising the step of knitting the plurality of individual ribbons into a Raschel net.

27. A method according to claim 25, further comprising the step of applying ink from an ink supply to the selected ribbons of the plurality of individual ribbons with a coloring roller.

28. A method according to claim 27, further comprising the step of controlling rotation of the coloring roller.

29. A method according to claim 27, further comprising the step of controlling contact between the coloring roller and the selected ribbons of the plurality of individual ribbons.

* * * * *